United States Patent [19]

Mathildus et al.

[11] Patent Number: 4,962,492
[45] Date of Patent: Oct. 9, 1990

[54] MAGNETO-OPTIC DATA RECORDING SYSTEM, ACTUATING DEVICE THEREFOR AND METHOD OF PROVIDING SAME

[75] Inventors: Gerardus L. Mathildus, Cascade; Matthew W. Hecht, Louisville; Robert A. Briones, Colorado Springs, all of Colo.

[73] Assignee: Laser Magnetic Storage International Company, Colorado Springs, Colo.

[21] Appl. No.: 188,261

[22] Filed: Apr. 29, 1988

[51] Int. Cl.⁵ .............................................. G11B 13/04
[52] U.S. Cl. ........................................ 369/13; 360/114
[58] Field of Search .................... 369/13, 116; 360/59, 360/114; 365/122

[56] References Cited

U.S. PATENT DOCUMENTS

| | | | |
|---|---|---|---|
| 2,352,023 | 6/1944 | Schuller | 360/108 |
| 2,751,274 | 6/1956 | Andrews | 360/78.12 |
| 2,916,547 | 12/1959 | Ginsberg et al. | 360/70 |
| 2,954,547 | 9/1960 | Singhaus | 360/105 |
| 3,171,106 | 2/1965 | Lemmond | 369/13 |
| 3,174,140 | 3/1965 | Hagopian et al. | 360/114 |
| 3,228,015 | 1/1966 | Miyata | 360/114 |
| 3,307,163 | 2/1967 | Rabinow | 360/93 |
| 3,361,878 | 1/1968 | Patterson et al. | 360/64 |
| 3,394,360 | 7/1968 | Miyata | 360/114 |
| 3,513,456 | 5/1970 | Nelson | 360/114 |
| 3,535,688 | 10/1970 | Waring | 360/114 |
| 3,582,570 | 6/1971 | Cushner | 360/59 |
| 3,624,622 | 11/1971 | DiChen | 365/122 |
| 3,626,114 | 12/1971 | Lewicki et al. | 360/59 |
| 3,629,517 | 12/1971 | Grimm | 360/114 |
| 3,666,894 | 5/1972 | Prochnow | 360/84 |
| 3,668,671 | 6/1972 | Everett et al. | 360/114 |
| 3,715,740 | 2/1973 | Schmit | 360/59 |
| 3,731,290 | 5/1973 | Aagard | 365/122 |
| 3,739,394 | 6/1973 | Becker | 360/59 |
| 3,778,791 | 12/1973 | Lewicki et al. | 360/59 |
| 4,300,176 | 11/1981 | Gilovich | 360/105 |
| 4,472,748 | 9/1984 | Kato et al. | 360/59 |
| 4,477,852 | 10/1984 | Ota et al. | 360/114 |
| 4,497,006 | 1/1985 | Deguchi et al. | 360/114 |
| 4,497,007 | 1/1985 | Greiner et al. | 365/10 |
| 4,509,156 | 4/1985 | Ohara et al. | 369/116 |
| 4,539,662 | 9/1985 | Hatano et al. | 369/13 |
| 4,573,149 | 2/1986 | Deguchi et al. | 369/13 |
| 4,586,092 | 4/1986 | Martens et al. | 360/59 |
| 4,594,699 | 6/1986 | Browder | 369/13 |
| 4,610,009 | 9/1986 | Connell | 369/13 |
| 4,630,249 | 12/1986 | Braat et al. | 369/13 |
| 4,686,661 | 8/1987 | Isaka | 369/13 |
| 4,695,994 | 9/1987 | Steenbergen et al. | 369/54 |
| 4,701,894 | 10/1987 | Watson | 369/13 |
| 4,701,895 | 10/1987 | Van Sant | 369/13 |
| 4,706,232 | 11/1987 | Funada et al. | 369/13 |
| 4,712,203 | 12/1987 | Saito et al. | 369/13 |
| 4,748,606 | 5/1988 | Naito et al. | 369/13 |
| 4,789,972 | 12/1988 | Oldham | 360/114 |

FOREIGN PATENT DOCUMENTS 1177577  11/1984  Canada .

OTHER PUBLICATIONS

"Magneto-Optic Recording Technology," Kryder, J. Appl. Phys., vol. 51, No. 1, pp. 3913-3918.

"Research Applies Magnetic Thin Films and the Magneto Optic Effect in Storage Devices," Imamura, Journal of Electrical Engineering, Mar. 1983, pp. 100-103.

"Magneto-Optical Disk with Reflecting Layers," Ohta et al., Proceedings SPIE, vol. 382, pp. 252-259, (1983).

(List continued on next page.)

Primary Examiner—Stuart S. Levy
Assistant Examiner—Hoa Nguyen
Attorney, Agent, or Firm—Sheridan, Ross & McIntosh

[57] ABSTRACT

A magneto-optic data recording system and actuating device therefor comprises a permanent magnet mounted adjacent to a magneto-optic disk medium. The permanent magnet is rotatable about its longitudinal axis to change the polarity of the magnetic field which supplied to the medium. Rotation of the magnet is achieved by activation of electromagnet actuators located laterally adjacent to the permanent magnet. Rotation of the magnet through 180° is preferably achieved within less than 1 period of revolution of the disk, preferably less than ½ the period of revolution of the disk.

25 Claims, 4 Drawing Sheets

OTHER PUBLICATIONS

"MnAlGe Films for Magneto-Optic Applications," Sherwood et al., J. Appl. Physics, vol. 42, pp. 1704–1705, (1971).

"Control Mechanics," Van Rosmalen, Principles of Optical Disk Systems, pp. 125–188.

"Compact and Highly Efficient Faraday Rotators," Yoshino, Japanese Journal of Applied Physics, vol. 19, No. 4, Apr. 1980.

"A Compact Optical Isolator," Iwamura, Optical and Quantum Electronics, vol. 10, pp. 393–398.

"Compact Optical Isolator for Near-Infrared Radiation," Shibukawa et al., Electronics Letters, Nov. 24, 1977, vol. 13, No. 20.

"Simple, Compact, High-Performance Permanent--Magnet Faraday Isolator", Gauthier et al., Optics Letters, vol. 11, No. 10, Oct. 1986, pp. 623–625.

MAGNETO-OPTIC DATA RECORDING SYSTEM, ACTUATING DEVICE THEREFOR AND METHOD OF PROVIDING SAME

FIELD OF THE INVENTION

The present invention relates to a system and method for providing data recording of a magneto-optic type and particularly a system and method for producing a magneto-optic data recording system having a permanent magnet for generation of the bias field.

BACKGROUND INFORMATION

Of the two most commonly used methods for recording data, such as in a computer system, namely magnetic methods and optical methods, each has advantages. Magnetic systems are well understood and can record in an erasable mode. Optical systems, while often not erasable, can record data at a higher density than most magnetic systems. Magneto-optic systems are capable of combining features of both systems to provide a system which has a high data density and is also erasable.

Several magneto-optic recording schemes have been proposed. The scheme of most interest with respect to the present invention depends on the existence of a recording medium displaying two effects. The first is the Kerr magneto-optic effect. A material which displays this effect produces a change in the polarization of light which reflects from a magnetized area of the material. For example, polarized light which falls on a magnetized area will undergo rotation of the polarization plane upon reflectance from an area magnetized in a given polarity. A rotation in the opposite direction is produced by an oppositely-magnetized area.

The second effect is the effect under which media have a high coercive force at low temperatures and a low coercive force at high temperatures; i.e., under the second effect, the media are more easily magnetized at high temperatures than at low temperatures.

In a magneto-optic system, data can be recorded on the medium by using a heat source to heat an area of the medium above the temperature at which the medium is magnetizable and exposing the heated medium to a low global magnetic field. Upon cooling, the area which was heated and exposed to the magnetic field will be magnetized. Initially, the medium is normally bulk polarized in one direction. Thereafter, it is possible to detect whether a given area of the medium is or is not magnetized in a desired magnetic polarity by reflecting polarized light from the area and detecting rotation of the light. In this way, areas of a medium can be designated as binary digits or bits and the binary value of a bit can be assigned according to the presence or absence of a predetermined direction of rotation of polarized light, which will correspond to an upward or downward magnetization of the area of the medium. By reversing the polarity of the bias field and heating a written area, the area will return to the original bulk-magnetized direction. In this way, one can erase old information. Magneto-optic systems generally of this type are described in Mark H. Kryder, "Magneto-Optic Recording Technology", *J. Appl. Phys.*, vol. 57, No. 1, pp. 3913–3918 and Nobutake Imamura, "Research Applies Magnetic Thin Films and The Magneto-optical Effect in Storage Devices", *Journal of Electrical Engineering*, March 1983, pp. 100–103.

A system of this type requires at least four parts: a medium displaying both the Kerr magneto-optic effect and the Curie effect; a heat source for heating an area of the medium to the magnetization temperature; a magnetic field source; and apparatus for detecting whether a given area of the medium has been magnetized with a given polarity. Each of these four components can be provided in a number of forms and configurations. Several factors are important in the selection of these components and moreover these factors are interrelated. The interrelationships are not always in a fortuitous sense, such that selection of a device with a given favorable factor may also necessitate accepting another unfavorable factor. Furthermore, the relationships between factors are not necessarily linear relationships so that changing a factor in a known amount produces changes in other factors which are not necessarily predictable. As a result of these relationships, it is not possible to select the four components based on a theoretical knowledge of the characteristics of the components.

Among the factors which enter into providing the four components are magnetic characteristics of the magnetic field source, characteristics of the media, and characteristics of the apparatus and method for changing polarity of the magnetic field source.

Particularly preferred in connection with the present invention is a magnetic field source which is a permanent magnet and a heat source which is a laser. A magneto-optical disk exerciser using a permanent magnet is briefly described in K. Ohta, et al. "Magneto-Optical Disk with Reflecting Layers", *Proceedings, SPIE*, volume 382, pp. 252–259. Use of a fine permanent magnet wire to magnetically write on an MnAlGe film is disclosed in R.C. Sherwood, et al. "MnAlGe Films for Magneto-Optic Applications", J. Appl. Physics, V. 42, No. 4, pp. 1704–1705. If a permanent magnet is used as a magnetic field source, the material selected for the permanent magnet will have a number of characteristics which affect other aspects of the system. The permanent magnet will produce a magnetic field having a particular spatial configuration. Of special interest will be the magnitude of the magnetic field strength at positions spaced from the surface of the permanent magnet. The configuration of the magnetic field of the magnet determines how close the magnet must be to the disk, places constraints on what type of disk material can be used, and how far the magnet must extend longitudinally past the recording medium in order to provide the necessary field strength at the edges of the medium. The field strength at the medium will be affected by disk wobble. Because field strength diminishes as the square of the distance variation can be decreased by using a stronger magnet at a greater distance. However, stronger magnets are typically larger and heavier and thus more difficult to turn.

The permanent magnet also has a mass density which is important in connection with moving the permanent magnet to produce a desired polarity of the magnetic field at the disk. When the permanent magnet is to be rotated around its longitudinal axis in order to write or erase a bit, the mass density of the magnet affects how much energy is consumed in rotating the magnet and how quickly the orientation of the magnet can be changed. The shape of the magnet, and in particular the cross-sectional shape of an elongated magnet will affect the strength and shape of the magnetic field, which in turn has the effects described above, and also has an effect on how close the magnet can be positioned to the medium and still provide for the clearance necessary when the magnet is moved or rotated. The cross-sectional shape also affects the moment of inertia about the longitudinal axis of the magnet and thus affects how much energy is consumed in rotating or moving the magnet.

The type of material selected for the medium affects the temperature and field strength which is needed in order to write or erase a bit. This factor in turn affects what type of magnetic material can be used for the permanent magnet, how close the permanent magnet must be positioned to the medium, which in turn can constrain the cross-sectional shape of the magnet needed to assure proper clearance with respect to the disk as the magnet is rotated. The selection of magnetic medium material also affects the price of the disks and may affect the type of substrate upon which the medium can be provided. The design of the apparatus for moving or rotating the permanent magnet also interacts with other aspects of the total design. In a system in which the permanent magnet is rotated by one or more electromagnets each producing a field that interacts with the permanent magnet field, the size and shape of the permanent magnet affects the shape of the electromagnet actuator coils because the electromagnet actuator coils must clear the permanent magnet as it rotates. The field strength of the permanent magnet at the location of interaction with the field produced by the actuator coils must be sufficiently strong to produce the desired rotation of the permanent magnet and thus the shape of the permanent magnet field places constraints on the types and particular shapes of actuator coils which can be used which, in turn, affects the amount of energy which is consumed in moving or rotating the permanent magnet.

Relatedly, the manner in which the actuator is used to rotate the magnet affects a number of aspects of the system. The amount of time allocated for rotationally accelerating the permanent magnet and the method and amount of time used to decelerate the magnet and to hold it in the preferred position during a read or write will affect the amount of energy which is consumed both instantaneously, and averaged over a single rotation of the magnet and will also affect how quickly the magnet can be changed from one polarity to another. The method of accelerating and decelerating will affect the type of circuitry which is needed to control the actuator.

Although the above list of factors is not necessarily complete, it suffices to indicate that the large number of factors, and their non-linear interrelatedness make selection of a magneto-optic system a complex and difficult task which becomes even more so if the intent is to provide a magneto-optic system which is commercially usable and can be produced economically.

SUMMARY OF THE INVENTION

In accordance with providing a magneto-optical system that can properly function and be economically made, a number of related features should be included. A medium, preferably in the form of a rotatable disk has the property that it can be magnetized upon exposure to a magnetic field of a first magnitude when heated to a first temperature but does not become magnetized at a lower temperature upon exposure to the same magnitude magnetic field. A first portion of the medium is made susceptible to magnetization by heating to at least the first temperature, preferably by light means and preferably by a laser light source. In order that only the desired bit may be written, the size, intensity and duration of the light heat source and the heat conductive characteristics of the medium should be such that portions of the medium which are adjacent to the first area of the medium that is to be written to are maintained at a temperature less than the first temperature.

The present invention includes producing a magnetic field in order to magnetize the first portion of the medium by providing a permanent magnet. A permanent magnet system is believed to have lower overall power requirements, compared to an electro-magnet system. The magnet must produce a field strength with a magnitude at least equal to the magnitude necessary to magnetize the heated medium. The permanent magnet is mounted such that the magnetic field of a first polarity is located adjacent to the portion of the medium which is to be magnetized. In order to erase a written bit, e.g. by recording the bit with a magnetic polarity opposite that of a written bit, a device is provided for moving the magnet such that a magnetic field having an opposite polarity is placed adjacent to the portion of the medium where a bit is to be erased. This is preferably done by turning or rotating the permanent magnet about an axis of the magnet. The shape and type of the magnet provided is such that the magnet can be placed close enough to the medium to provide the necessary magnetic field strength and yet to avoid contact with the medium during the turning of the magnet.

To provide for rapid reading, writing and erasing of data on the disk, the devices for turning the magnet achieve the reversal of polarity in less than a predetermined time interval. Preferably, reversal of polarity is attained in less than one disk revolution and more preferably in less than about ½ disk revolution.

DETAILED DISCUSSION OF THE PREFERRED EMBODIMENT

Figure 1:
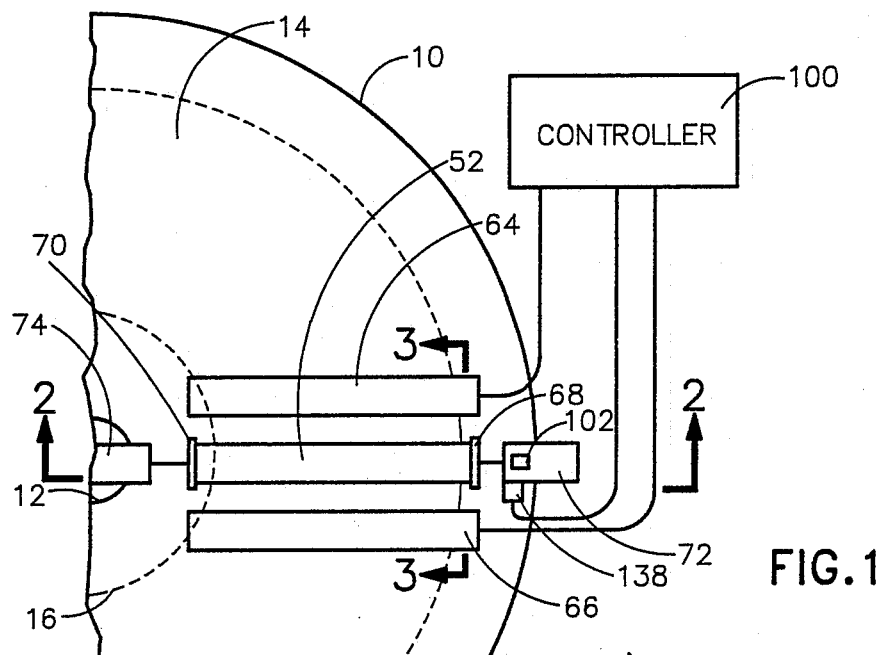
FIG. 1 is a schematic top plan view of a magneto-optic apparatus according to the present invention.

Referring now to FIG. 1, there is schematically depicted a magneto-optic recording system according to the present invention. A disk 10 rotatable about the center of a hub 12 includes a recording area 14 of magnetizable material bounded by inner and outer edges 16, 18. The magnetic material displays both the Kerr magneto-optic effect and the Curie effect. The medium can comprise a Gallium-Terbium-Iron compound or alloy. Such a medium is magnetizable upon exposure to a magnetic field having a magnetic field intensity of about 250 oersteds and a magnetic flux density of 250 gausses when heated to a temperature of least about 200° C. When at a temperature below about 150° C., the medium 14 will not become magnetized at a magnetic field intensity of 250 oersteds. In the preferred embodiment, the diameter of the disk 10 is approximately 5 inches (about 125 millimeters). The disk 10 has a stiffness such that upon rotation the vertical displacement or wobble is preferably less than about 0.5 millimeters. The disk 10 is rotated at about 36 hertz providing a revolution time of about 27 milliseconds.

Figure 2:
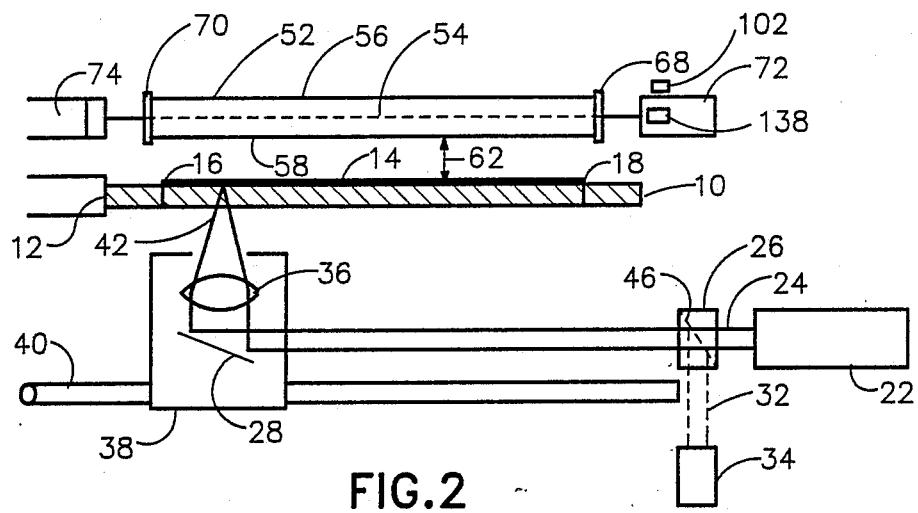
FIG. 2 is a cross-sectional view taken along line 2—2 of FIG. 1.

Referring now to FIG. 2, a laser light source 22 is located to provide a light beam 24 which travels through a beam splitting device 26. Light from the laser 22 is then directed towards the disk 10, for example by being reflected from a mirror 28 or other beam axis-changing device. Beam splitter 26 has the characteristic that light reflected from the disk 14 is partly reflected or otherwise has its direction changed to provide a reflected beam 32 to a detecting apparatus 34. The mirror 28 and possibly a focusing device such as a lens 36 are mounted on a means for radial movement such as a carriage 38 and a rail 40 system. Systems for reflecting a focused light beam from a recording medium are well known and generally described in, for example, U.S. Pat. No. 4,586,092 issued Apr. 29, 1986 to Martens, et al. and U.S. Pat. No. 4,630,249 issued Dec. 16, 1986 to Braat, et al. In the present system, the focused or "readout" light spot 42 is approximately 4.5 mm in diameter and produces an area on the disk 10 which is heated to above about 250° C. and has a diameter of about 1 micrometer.

The detecting system 34 and/or optical axis changing system 26 are configured to preferentially detect polarization of light which is reflected from the disk 10 which is magnetized in a first magnetic polarity. The system is able to distinguish between light reflected from areas of the disk 10 which are magnetized in such first polarity and areas of the disk 10 which are magnetized in a second magnetic polarity. One method of providing for such discrimination is to provide the detecting apparatus 34 with a polarization-sensitive device 46 such as a polarizing beam splitter, a sheet polarizer, a Rochon prism or a Wallaston prism. (Oriented in the proper angular orientation). The device 46 will change the modulation of polarity to a modulation of intensity for detection by the detector 34. The detector 34 will change the intensity modulation to an electrical current modulation. Because the medium 14 displays the Kerr magneto-optic effect, the polarization of light reflected from the disk 10 will be affected by the magnetic polarity of the area of the disk 10 from which the light is reflected.

Figure 3:
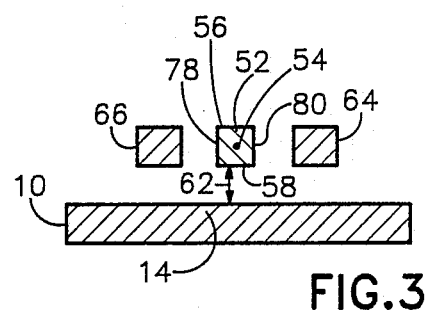
FIG. 3 is a cross-sectional view taken along line 3—3 of FIG. 1 showing the magnet in a write position.

A permanent magnet 52 is mounted adjacent to portions of the disk 10. The permanent magnet 52 is preferably a high grade magnetic material such as a neodymium iron boron alloy, e.g. material marketed under the name "Crumax 32" of Colt Corporation. The permanent magnet 52 produces a magnetic flux density of at least about 280 oersted, preferably at least 350 oersted at the surface of the disk 10 along the entire width of the writing area bounded by inner and outer boundaries 16, 18. Preferably the permanent magnet 52 extends about 10 mm beyond the boundaries 16, 18. As best seen in FIG. 3, the magnet 52 preferably has a square cross section, although other configurations of the magnet 52 are possible. It has been found that a square cross section provides a useful combination of magnetic field intensity at the surface of the disk 10 and moment of inertia about the longitudinal axis 54 of the magnet 52. In particular, it has been found that a square cross section produces a higher field per unit of moment of inertia than does a magnet of circular cross section.

The magnet 52 has a first surface 56 and a second surface 58. The magnetic properties of the permanent magnet 52 are such that the space adjacent to the first surface 56 has a first magnetic polarity while the space adjacent the second surface 58 has a second magnetic polarity opposite to the first magnetic polarity. In the preferred embodiment, the width of each face of the rectangular magnet 52 is about 4.5 millimeters. The distance 62 between the first or second face 56, 58 and the surface of the disk 10 is about 6.5 millimeters. The length of the permanent magnet 56 is about 52.5 millimeters. The magnet 52 is mounted in holders 68, 70, attached to bearings 72, 74. Sensors 102, 138 for sensing the rotational position of the permanent magnet 52, can be provided, for example, by use of Hall sensors, gaussmeters or by optically sensing markers on the magnet 52 or holder 68.

During operation, the permanent magnet 52 is maintained in one of at least two conditions, a steady-state condition in which the first or second face 56, 58 of the magnet 52 is substantially parallel and adjacent to the recording area 14, and a rotating condition, used to reposition the magnet 52 to a new steady-state position with a different magnetic polarity at the recording area 14.

First and second actuators 64, 66 are provided for stabilizing and/or turning the magnet 52 about its longitudinal axis 54. The actuators 64, 66 are preferably electro-magnets. In the preferred embodiment the actuators each include 90 turns of 28 AWG wire into a 4 millimeter depth and a 3 millimeter height about an air core. Activation of the actuators 64, 66 produces a second magnetic field which interacts with the first magnetic field produced by the permanent magnet 52 in such a manner as to create a torque on the permanent magnet 52 about the longitudinal axis 54. This torque causes the rotational acceleration of the permanent magnet 52 about the longitudinal axis 54. The magnitude and duration of the magnetic field produced by the actuators 64, 66 must provide sufficient acceleration to the permanent magnet 52 that the permanent magnet 52 can be rotated approximately 180° within a short time period. Preferably, 180° rotation of the permanent magnet 52 can be achieved within about 1 period of revolution of the disk 14, and preferably within about ½ period revolution of the disk or less. By providing such rapid rotation of the permanent magnet 52, the magnetic field polarity can be reversed within a few, or preferably less than 1 disk revolution and thus any bit position on the disk 10 can be accessed for writing or erasing within a few periods of revolution of the disk 10, preferably within less than 1 period of revolution and most preferably within less than about ½ period of revolution of the disk.

The speed with which the permanent magnet 52 can be rotated depends, in part, upon the field strength of the second magnetic field generated by the actuators 64, 66. In general, the stronger the field strength of the second magnetic field, the more rapidly the permanent magnet can be rotated. However, rotation of the permanent magnet 52 produces a certain amount of magnetic "noise" which has an adverse effect on other components of the system including magnets employed in moving the focusing lens 36 and the tracking carriage 38. Preferably the focusing or tracking magnets have a low sensitivity to external magnetic fields and to the rotating permanent magnet 52. Such adverse effects can also be diminished by providing magnetic shielding for other components of the system.

The magnetic field created by the permanent magnet 52 can also affect other components of the system including the magnets for the focusing lens 56. Thus, although a strong magnetic field of the permanent magnet 52 is useful to assist in writing or erasing data and in turning the permanent magnet, the field should not be so strong as to substantially adversely affect other components of the system created.

Preferably, the actuators 64, 66 can also be used to rotate the magnet 52 by 90° such that a third or fourth surface 78, 80 is adjacent to the medium 14. This positional configuration of the permanent magnet 52 is useful when it is desired to provide a lower magnetic field intensity at the disk 14 during read operations as opposed to write or erase operations.

Although the configuration depicted in FIG. 3 shows the bottom surface 58 substantially parallel to the surface of the disk 10, some amount of non-parallelism can be tolerated provided a sufficient magnetic field strength is provided to the disk 14. In particular, a misalignment of up to about plus or minus 20°, preferably less than about plus or minus 16°, can be tolerated.

Figure 4:
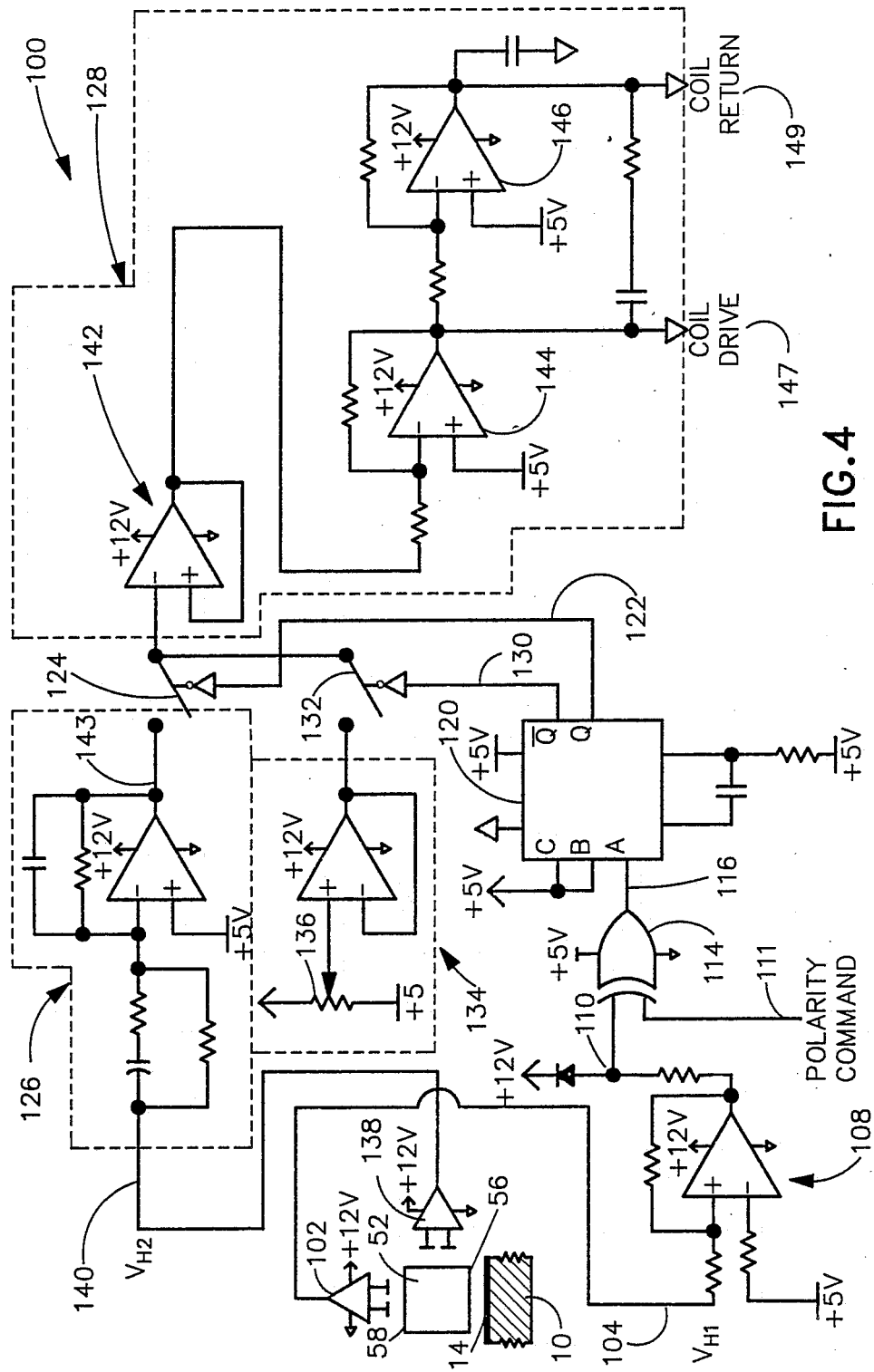
FIG. 4 is a schematic depiction of circuitry for a controller for activating actuators and showing the magnet in an erase position.

A preferred embodiment of the control circuitry 100 for rotating the permanent magnet 52 180 degrees is illustrated in FIG. 4. FIG. 4 includes drive circuitry 128 for supplying current to the actuators 64, 66. The direction and magnitude of rotational acceleration of the permanent magnet 52 which occurs depends, at least in part, on the magnitude and polarity of the current supplied by the drive circuitry 128. Two selectable portions of the circuitry depicted in FIG. 4 are used to control the current magnitude and polarity corresponding to two phases of operation. The first portion is the proportional-integral-differential or "PID" circuitry 126. The function of the PID circuitry 126 is to control the drive circuitry 128 in such a way as to stabilize the rotational position of the magnet 52 so that either the first surface 56 or second surface 58, whichever is closer to the recording area 14, is held substantially adjacent and parallel to the recording area 14. The second switchable portion is the acceleration circuitry 134. The function of the acceleration circuitry is to control the drive circuitry 128 in such a way as to rotationally accelerate (and, preferably subsequently decelerate) the permanent magnet, in order to bring a desired surface 56, 58 of the permanent magnet close to or adjacent to the recording area 14. The PID circuitry 126 and the acceleration circuitry 134 are switched to provide respectively, stabilizing or accelerating control for the drive circuitry 128. The polarity of the magnet which is desired is provided to the circuitry depicted in FIG. 4 in the form of a polarity command 111. The polarity command 111 is preferably a digital signal, generated by devices well-known in the art, such as a disk-controller (not shown).

For purposes of the discussion below, when the polarity command 111 is a logical-one, the desired polarity of the magnet 52 is that corresponding to the write position of the magnet 52, i.e. the position in which the magnet 52 produces a field having the polarity used in writing data to the disk, as described above. When the polarity command 111 is a logical-zero, the desired polarity of the magnet 52 is that corresponding to the erase position, i.e. the polarity used in erasing data on the disk. Other types of polarity commands can be used, as will be apparent to those skilled in the art.

Before describing the switching or selection of the PID 126 and accelerating circuitry 134, features of those circuits will be described.

Figure 5A:
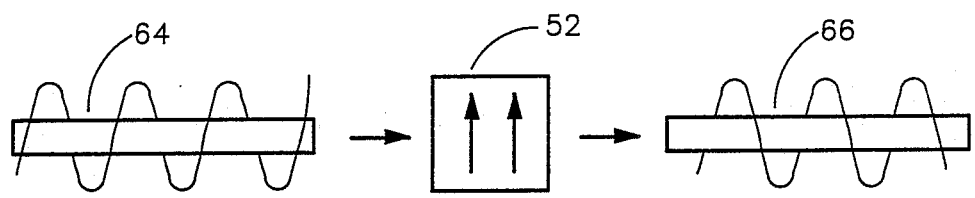
FIG. 5A–5E are schematic elevational views of actuators and a permanent magnet in various stages of rotation.
Figure 5B:
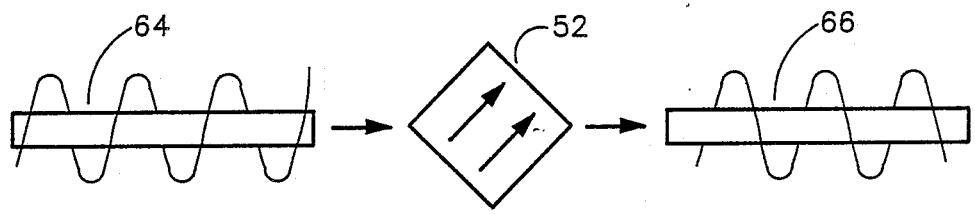

The acceleration circuitry 134 generates a signal that is used by the actuator drive circuitry 128 to, in turn, cause the actuators (such as electromagnets) 64, 66 to apply a torque to the permanent magnet 52. The permanent magnet 52, as a consequence of the torque being applied by the actuators 64, 66, experiences a rotational acceleration. The amount of rotational acceleration that the permanent magnet 52 experiences can be varied by adjusting the potentiometer 136 thereby varying the signal subsequently applied to the actuators 64, 66. The torque occurs because of magnetic interaction between the rotatable magnet 52 and the electromagnets 64, 66. Referring to FIG. 5A, when the actuators 64, 66 produce a magnetic field with the polarity indicated by the arrows in FIGS. 5A-5E a torque is provided on the magnet tending to cause rotation towards the position depicted in FIG. 5B. The magnet 52 is provided with sufficient velocity to carry it at least past the position depicted in FIG. 5C. The magnet must be positioned rotationally within the capture range of the PID circuit, as described below, before the rotation caused by the acceleration circuitry 134 is overcome by friction, extraneous magnetic forces or the like. Once in the capture range of the PID circuit 126, the PID circuit can be used to position and stabilize the magnet 52 substantially in the position shown in FIG. 5E. Similarly, when the magnet 52 is in the position depicted in FIG. 5E, and the actuators 64, 66 produce a magnetic field with the polarity depicted in FIGS. 5A-5E, a torque is applied to the magnet 52 tending to cause rotation towards the position depicted in FIG. 5D. In this way, the actuators 64,66 are used to rotationally accelerate the magnet 52 without the necessity for changing the polarity of the magnetic fields produced by the actuators 64, 66 (thus reducing switching requirements) regardless of whether the magnet 52 is in the read position or the write position.

Proportional-Integral-Derivative (PID) control circuitry, well-known in the control system art, has been utilized in a broad range of applications where the output or control signal is proportional to a linear combination of the input signal, the time integral of the input signal and the time rate of change of the input signal. The PID circuitry 126 of the present invention is used to control the rotational position of the permanent magnet 52 when the face which is to be positioned parallel and adjacent to the recording surface 14 is within a capture range of rotation from being so positioned. The capture range of the PID is the range of rotational deviation from the desired position (i.e. from the write position or the erase position) within which the PID circuitry is effective to position and stabilize the magnet substantially at the desired position, i.e. plus or minus a maximum tolerable deviation. Typically, the capture range will not be greater than plus or minus 90° from the desired position. For a given capture range the acceleration circuitry 134 must provide sufficient torque to carry the magnet 52 to within this capture range, such as by providing a relatively greater-magnitude and/or longer duration acceleration or shorter-duration deceleration. The proportional aspect of the PID circuitry 126 provides adequate gain for the resulting control signal to be used by the subsequent actuator drive circuitry 128. The derivative aspect of the PID circuitry 126 operates to reduce the rotational velocity of the permanent magnet 52 to zero thereby stopping or holding the permanent magnet 52 in the desired position. The final component of the PID circuitry 126, the integral portion, overcomes any static offset due to bearing friction or the like thereby assuring a substantially complete 180 degree rotation of the permanent magnet 52. The input signal to the PID circuitry 126 is the error signal $VH_2$ which is indicative of both the velocity and position of permanent magnet 52. Consequently, PID circuitry 126 operates on error signal $VH_2$ to reduce the velocity of permanent magnet 52 to zero and assure a complete 180 degree rotation.

To control the rotation of the permanent magnet 52 once it is within the capture range, an error signal $V_{H2}$, produced by a second Hall sensor 138, is input to the PID circuitry 126 on a lead 140. The error signal $V_{H2}$ is indicative of both the position of the rotating permanent magnet 52 relative to the desired position, and the rotational velocity of the permanent magnet 52. The PID circuitry 126 processes the error signal $V_{H2}$ and outputs a correction signal on an output lead 143 that is designed to reduce the position and velocity aspects of the error signal $V_{H2}$. The correction signal is used by the drive circuitry 128 to control actuators 64, 66 which, just as with the acceleration circuit 134, apply a torque to the permanent magnet 52. When the position and velocity aspects of the error signal are reduced to zero then either the first face 56 or the second face 58 is positioned substantially parallel and adjacent to the recording surface 14. By appropriate adjustment, which can include using a Hall sensor in another location, the PID circuitry can be used to maintain the permanent magnet 52 substantially at the 90° position.

For purposes of the discussion below, the erase position of the magnet 52 is the position depicted in FIG. 4, with the first surface 56 adjacent to the recording area 14 and the write position is the position depicted in FIG. 3, with the second surface 58 adjacent to the recording area 14. Other conventions for the erase and write positions can be used as will be apparent to those skilled in the art.

Included in control circuitry 100 is a first Hall sensor 102 for sensing the strength and polarity of the magnetic field produced by the permanent magnet 52 adjacent the recording area 14 and outputting an analog signal $V_{H1}$ on a lead 104 that is indicative thereof. The sensing circuitry and apparatus can be configured in a variety of ways so that the analog signal $V_{H1}$ can have one of many possible relationships to the position of the permanent magnet 52. In the embodiment depicted in FIG. 4, the signal $V_{H1}$ has a range between a maximum positive value and a maximum negative value which, for convenience, will be designated +x and −x. For purposes of the following discussion, the signal $V_{H1}$ is such that a value of +x indicates that the first surface 56 of the permanent magnet 52 is disposed substantially parallel and adjacent to the recording area 14, and an analog signal $V_{H1}$ of −x indicates that the second surface 58 of the permanent magnet 52 is disposed substantially parallel and adjacent to the recording area 14. An analog signal $V_{H1}$ between the maxima +x and −x indicates that neither the first surface 56 nor the second surface 58 of the permanent magnet 52 is disposed parallel to the recording area 14. For example, an analog polarity signal $V_{H1}$ of about 0 would typically indicate that the permanent magnet 52 has been rotated relative to the recording area 14 such that the first surface 56 and the second surface 58 are substantially at right angles to the recording surface 14.

The analog signal $V_{H1}$ is input, on lead 104, to a comparator 108 for generating a polarity signal that indicates whether the analog signal $V_{H1}$ is of a positive or negative polarity. The comparator 108 determines the polarity of analog signal $V_{H1}$ by comparing the analog signal $V_{H1}$ to zero. If the analog signal $V_{H1}$ is greater than zero then the comparator 108 outputs a logical-one polarity signal at an output point 110 which indicates that the second surface 58 of the permanent magnet 52 is closer to the recording area 15 than the first surface 56. If, on the other hand, the analog signal $V_{H1}$ is less than zero, then the comparator 108 outputs a logical-zero polarity signal at the output point 110 which indicates that the first surface 56 is closer to the recording surface 14 than the second surface 58. Since the polarity signal changes when the analog signal $V_{H1}$ passes through zero the comparator 108 is also known in the art as a zero-crossing detector.

The polarity signal output by the comparator 108 at the output point 110 is compared to the polarity command 111 by an Exclusive-Or gate 114. If the polarity signal, a logical-one or logical-zero, is different from the polarity command 111, also a logical-one or logical-zero, then the Exclusive-Or gate 114 will generate a flip signal on an output lead 116. The flip signal initiates the operations necessary to rotate the permanent magnet 52 180 degrees. For example, if the polarity signal is a logical-one, indicating that the permanent magnet 52 is oriented to write data on the recording surface 14, and an erase data polarity comman 111 represented by a logical-zero is issued, then Exclusive-Or gate 114 will generate a flip signal.

The flip signal is input, on lead 116, to a One-shot 120 for initiating the 180 degree rotation of the permanent magnet 52. The one-shot 120, upon receiving the flip signal, issues a signal on a first lead 122 which opens a first switch 124 thereby disconnecting the PID circuitry 126 from the actuator drive circuitry 128. Simultaneously, the One-shot 120 issues a signal on a second lead 130 which closes a second switch 132 thereby connecting the acceleration circuitry 134 to the actuator drive circuitry 128 for rotating the magnet as described above.

Figure 5C:
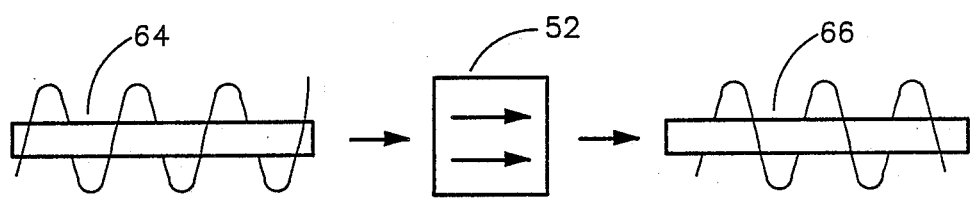
Figure 5D:
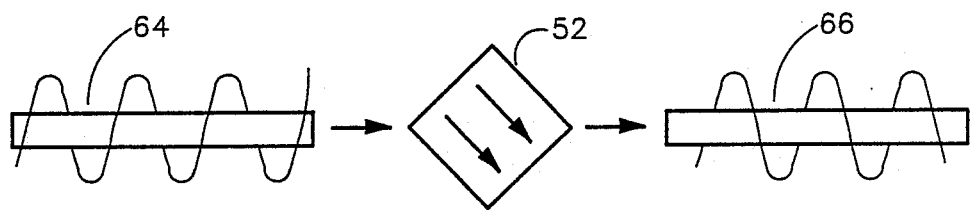
Figure 5E:
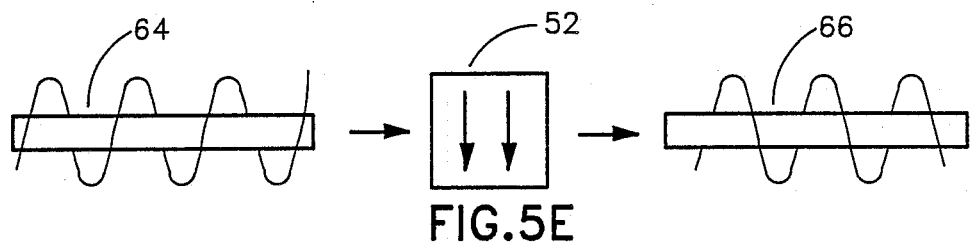

The polarities of the permanent magnet 52 and the actuators 64, 66 are such that zero torque is applied to the permanent magnet 52 when it has rotated 90 degrees as shown in FIG. 5C. However, the rotational momentum of permanent magnet 52, produced during the first 90 degrees of rotation, typically carries the permanent magnet 52 past the 90 degree rotation point. Once the permanent magnet 52 has rotated further than 90 degrees, the polarities of the actuators 64, 66 and the permanent magnet 52 are such that the torque applied to the permanent magnet 52 causes a rotational deceleration of the permanent magnet 52. It is theoretically possible to open switch 132 before the magnet 52 passes the 90° position. However, in order to have sufficient torque to achieve rotation in the desired time, such as less than one disk rotation, it is useful to include an active deceleration phase (in addition to, e.g. frictional deceleration) so that the magnet does not have so much rotational momentum that it overshoots or rotates through and beyond the PID capture range before the PID can achieve capture of the magnet. Preferably, before the torque causing the deceleration totally halts the rotation of the permanent magnet 52, the One-shot 120 terminates the connection between the acceleration circuitry 134 and the actuators 64, 66 by opening the second switch 132 while, preferably at the same time, re-establishing the connection between the PID circuitry 126 and the actuators 64, 66 such as by closing the first switch 124. The One-shot 120 is configured to open the second switch 132 and close the first switch 124 a pre-determined time after the second switch 132 in closed. This time is selected such that the magnet 52 is given sufficient torque to rotate it within the capture range of the PID circuitry 126. When the PID circuitry 126 is reconnected to the actuator drive circuitry 128, the permanent magnet 52 is within the capture range. Due to the operation of the One-shot 120 as depicted in FIG. 4, the PID circuitry 126 controls the rotation of permanent magnet 52 whenever the acceleration circuitry is not controlling the rotation of the permanent magnet 52.

The drive circuitry 128 utilized by both the PID circuitry 126 and the acceleration circuitry 132 includes a voltage follower 142 and push-pull amplifiers 144, 146 which energize the coils associated with actuators 64, 66 according to the signals issued by the acceleration circuitry 134 and the PID circuitry 126. The actuators 64, 66, in turn, apply a torque to the permanent magnet 52. The coils associated with the actuators 64, 66 can be connected to the push-pull amplifiers 144, 146 through the coil drive and coil return lines 147, 149 in either a series or parallel configuration. Since the actuators 64, 66 are on opposite sides of the permanent magnet 52 the magnetic field, and hence the torque, produced by the first actuator 64 must be directed parallel to the magnetic field of the second actuator 66 to promote rotation of permanent magnet 52. Consequently, when the actuator coils are oppositely wound, as depicted in FIG. 5, the current flowing in the coil associated with the first actuator 64 must be of an opposite polarity from the current flowing in the coil associated with the second actuator 66. Opposite polarity current flows in the coils of the actuators 64, 66 is achieved by methods well known in the art.

In a second embodiment, rotation of the magnet is achieved by separately-controlled acceleration and deceleration phases. In the second embodiment, following initiation of the rotational acceleration of the permanent magnet 52 the actuator 64, 66 are deactivated, such as by ceasing the flow of current through the electro-magnets, and the permanent magnet is allowed to freely rotate or coast for a period of time. After the coasting period, the rotation of the permanent magnet 52 is then decelerated so that the magnet 52 is brought to within the capture range of the PID circuitry 125, but does not have so much rotational momentum that the PID can not capture the magnet. The PID then, as described above, positions and maintains the magnet 52 such that the first surface 56 is adjacent to the disk 10 and assumes the position previously occupied, as depicted in FIG. 3, by the second surface 58.

Thus, in the alternative embodiment, rotation of the magnet 52 is achieved during 3 phases. A first acceleration phase occurs while the actuators 64, 66 are activated. A second coasting phase occurs while the actuators 64, 66 are not activated. A third deceleration phase occurs while the actuators 64, 66 are activated. The amount of time allocated to each of the phases is selected to provide low expenditure of energy and rapid rotation of the permanent magnet 52. In one operable configuration, the first acceleration phase is used for 11 milliseconds, the second coasting phase is used for 5 milliseconds and the third deceleration phase is used for 6 milliseconds. Thus, the total time required for rotation of the permanent magnet 52 by 180° is about 22 milliseconds, which is less than about 1 period of revolution of the disk 10.

One system which has been tested reaches a tolerable alignment of the permanent magnet 52 in about 20 milliseconds when the actuators 64, 66 are provided with current of about 800 milliamps. When the amperage is doubled to about 1.6 amps, the lengths of the phases can be shortened to about 7.8 milliseconds for the first acceleration phase, 2.8 milliseconds for the second coasting phase, and 5 milliseconds for the third deceleralion phase to achieve tolerable alignment in about 15 milliseconds. In this system the actuators 64 and 66 presented a resistance of about 5.1 ohms such that the current of 1.6 amps required an instantaneous power of 13 watts while the current of 800 milliamps required an instantaneous power of 3.26 watts. Although a higher current lowers the rotation time of the magnet in some configurations, a higher current also requires that a larger amount of time must be allowed to recharge the rotation power source for the next revolution.

Figure 6:
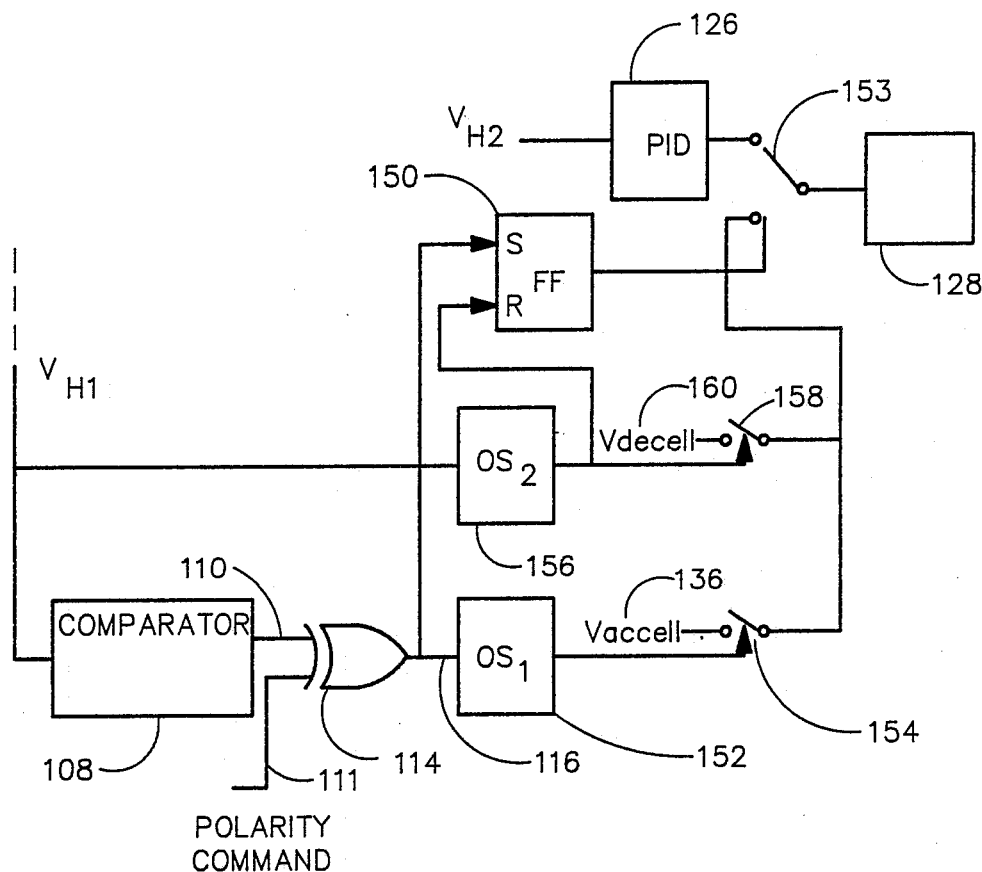
FIG. 6 is a schematic depiction of circuitry for an alternative controller for activating the actuators.

For use in the alternative rotation method, an alternative embodiment of the control circuitry 100 having two One-shots is provided, as shown in FIG. 6. Generation of the flip signal is done substantially as in the embodiment described in connection with FIG. 4. The flip signal is input to both an S-R flip-flop 150 and first One-shot 152 to initiate the 180 degrees rotation of the permanent magnet 52. The S-R flip-flop responds to the flip signal by flipping switch 153 thereby disconnecting the PID circuitry 126 from the actuator drive circuitry 128. The first One-shot 152 responds to the flip signal by closing third switch 154 thereby connecting the acceleration circuitry 136 to the actuator drive circuitry 128. The actuator drive circuitry 128 responds to the signal output by the acceleration circuitry 136 and causes the permanent magnet 52 to rotate. The first One-shot 152 is timed such that it disconnects the acceleration circuitry 136 from the actuator drive circuitry 128, by opening the third switch 154, just prior to the point where the permanent magnet 52 has rotated 90 degrees. Momentum then carries the permanent magnet 52 through the 90 degree rotation point. With the permanent magnet rotated between 90 and 180 degrees a second One-shot 156 is triggered by the transition in the analog signal $V_{H1}$ that occurs at the 90 degree rotation point. In response to the trigger, the second One-shot 156 closes a fourth switch 158 thereby connecting the deceleration circuitry 160 to the actuator drive circuitry 128. The second One-shot 156 also resets the flip-flop 150 so that the PID circuitry 126 will be reconnected to the actuator drive circuitry 128 following the deceleration operation. The deceleration circuitry 160 causes the actuators 64, 66 to apply a torque to the permanent magnet 52 which opposes the rotation of the permanent magnet 52 during the 90-to-180 degree phase of the rotation. The second One-shot 156 is timed such that it terminates the connection between the deceleration circuitry 160 and the actuator drive circuitry 128 by opening the fourth switch 158 prior to completely halting the rotation of the permanent magnet 52. Once the fourth switch 158 is opened, the S-R flip-flop 150 reconnects the PID circuitry 126 to the actuator drive circuitry 128 which, just as in the preferred embodiment, operates to stabilize either the first face 56 or the second face 58 in a position parallel and adjacent to the recording surface 14.

For most purposes, the embodiment depicted in FIG. 4 is preferred, because of the requirement for fewer and less expensive parts and anticipated low construction and maintenance costs.

The manner of operation of the magneto-optic system according to the embodiment depicted in FIG. 4 will now be described, beginning with the magnet in the erase configuration, as depicted in FIG. 4. In this configuration, when the polarity signal is equal to the polarity command, switch 124 is closed and switch 132 is open. Consequently, the PID circuitry 126 is maintaining the magnet, within a maximum tolerable error, at the desired position. In the position depicted in FIG. 4, the first face 56 is positioned parallel and adjacent to the recording surface 14, i.e. in the erase position, and the polarity signal is a logical-zero. When the erase position is the desired position the polarity command is also a logical -zero, switch 124 is closed and switch 132 is open.

When the disk controller indicates that data is to be written to the disk, a logical-one polarity command is issued. Since the polarity signal, a logical-zero, is unequal to the polarity command 111, the Exclusive-Or gate 114 issues a flip signal to the One-Shot 120. The One-shot 120, in response to the flip signal, opens the first switch 124, thereby disconnecting the PID circuitry 126 from the actuator drive circuitry 128 and closes the second switch 132, thereby connecting the acceleration circuitry 132 to the actuator drive circuitry 128.

The acceleration circuitry 134, with the aid of the actuator drive circuitry 128, causes the actuators 64, 66 to apply a torque to the permanent magnet 52 as described above. As a consequence of the torque applied by the actuators 64, 66, the permanent magnet 52 is subjected to a rotational acceleration. After the permanent magnet 52 has rotated 90 degrees, the polarities of the actuators 64, 66 relative to the permanent magnet 52 are such that there is no longer a torque. Once the permanent magnet 52 has rotated more than 90 degrees the torque being produced by actuators 64, 66 begins to oppose the rotation of permanent magnet 52. Consequently, the permanent magnet 52 is subjected to a deceleration. After a predetermined time, which has been selected such that the magnet 52 is given sufficient torque to rotate to within (but not to overshoot) the PID capture range, the One-shot 120 terminates the connection between the acceleration circuitry 134 and the actuator drive circuitry 128 by opening the second switch 132. Simultaneously with opening the second switch 132, the One-shot causes the first switch 124 to be closed, thereby connecting the PID circuitry 126 to the actuator drive circuitry 128. When the connection between the acceleration circuitry 134 and actuator drive circuitry 128 is terminated, the second face 58 is within the capture range of the PID circuitry 126.

The PID circuitry 126, when connected to the actuator drive circuitry 128 by the switch 124, processes the error signal $V_{H2}$ to generate a correction signal which will ultimately result in the second face 58 being positioned and maintained substantially parallel and adjacent to recording surface 14. The correction signal achieves this result by directing the actuators 64, 66 to apply torques to the permanent magnet 52 which reduce the position and velocity components of the error signal $V_{H2}$ to zero. A zero velocity component in the error signal $V_{H2}$ indicates that the rotation of the permanent magnet 52 has stopped. Likewise, a zero position component in the error signal $V_{H2}$ signifies that the permanent magnet 52 has been rotated 180 degrees and that the permanent magnet 52 is now in the write position.

When a bit is to be written onto a desired location of the disk 10 the tracking means 38, 40 are used to position light from the laser 22 on the desired track, i.e. radial position of the disk 10. Timing circuitry, similar to that described in U.S. Pat. No. 4,509,156 issued Apr. 2, 1985 to Ohara or U.S. Pat. No. 4,695,994 issued Sept. 22, 1987 to Steenbergen, is used to pulse the laser source 22 at a write intensity level when the read-out light spot 42 is aligned circumferentially with the desired bit position. An area of the medium 14 is heated by the read-out spot of the laser light 42 to a temperature at which it becomes magnetizable under the influence of the magnetic field produced by the permanent magnet 52. The laser light source 22 is then deactivated and the heated area of the disk 10 cools to provide a region of the disc which is magnetized in a first polarity.

Even though the permanent magnet 52 has been fully rotated 180 degrees by control circuitry 100 there may be forces present, such as friction forces, extraneous magnetic fields from tracking or focusing magnets or from the rotating disk which can disturb the steady-state. Consequently, switch 124 remains closed and the PID circuitry 126 maintains the steady-state until an erase polarity command is issued. When an Erase polarity command is issued, the sequence of events described above is repeated. However, although the events are the same because the starting position of the magnet is the write position, rather than the erase position, the result of the events is that the magnet 52 is rotated from the write position to the erase position and is maintained in that position. During erasing, the laser is not necessarily pulsed. It is possible to erase using a high intensity laser beam at a constant level to heat, and thus erase, continuously along the track for a period of time.

When it is desired to read one or more bits from the disk, according to one embodiment of the invention, the position of the permanent magnet 52 is unimportant and either polarity magnetic field can be caused to be adjacent to the disk 10. Alternatively, the actuators 64, 66 can be used to rotate the permanent magnet 52 by 90° such that either a third or a fourth face 78, 80 is adjacent to the disk 10 and a magnetic field of lesser intensity, as compared to the intensity of the field created by the magnet 52 in the position depicted in FIG. 3, is achieved. In either case the process of reading of the disk uses the light source 22 at a low, preferably continuous intensity so that a focused spot of light 42 is caused to fall on the bit position or positions to be read. This light is reflected from the disk and the reflection causes a rotation of the polarization of the light depending on the magnetization direction at the bit position. The reflected light travels through optical apparatus which can include mirrors or prisms 28, 46 polarizing beam splitters and the like. In a manner known in the art, the optical components are configured such that reflected light which has a predetermined amount of rotation imparted by the reflection is directed to optical detector 34 whereas light which has been differently rotated has a lower intensity at the detector such that it is distinguishable from light which has been rotated in a predetermined amount or sense. In this way, detector 34 provides a signal indicative of whether the bit position being read from the disk 10 has or has not been magnetized in a first polarity.

As will be apparent to those skilled in the art, a number of variations and modifications of the preferred embodiment can also be practiced. Alignment of the permanent magnet 52 can be assisted by placement of a keeper such as a steel or other feromagnetic plate above and adjacent to the permanent magnet 52. A steady state position of the magnet 52 can be provided or assisted by mechanical or gravitational methods. Rotation of the permanent magnet 52 can be achieved by means other than electromagnetic actuators including direct, gear or belt drive connection of the permanent magnet 52 with a motor such as an electric motor. Non-rectangular cross sectional shapes of the permanent magnet can be used including circular cross sections, and oblong cross sections. Magnetic material other than neodymium-iron-boron alloy can be used, including samarium cobalt magnetic material.

Although the foregoing invention has been described in detail by way of illustration and example for purposes of clarity of understanding, it will be obvious that certain changes and modifications may be practiced within the scope of the invention, as limited only by the scope of the following claims.

What is claimed is:

1. A magneto-optic data recording apparatus comprising:
    a magneto-optic medium which can be magnetized by exposure to a magnetic field of a first magnitude when heated to a first temperature and which does not become magnetized upon exposure to a magnetic field of said first magnitude when the temperature of said medium is less than about said first temperature;
    light means for heating a first portion of said medium to at least said first temperature wherein portions of said medium adjacent to said first portion are at a temperature less than said first temperature;
    a permanent magnet having a first axis, a first part, and second part and a magnetic field with a magnitude at least equal to said first magnitude;
    means for positioning said permanent magnet wherein at least said first part is adjacent to said first portion of said medium and said magnetic field has a first polarity relative to said magneto-optic medium; and
    means for reversing the polarity of the magnetic field adjacent to said first portion by turning said permanent magnet about said first axis while avoiding contact of said permanent magnet with said magneto-optic medium to a position in which at least said second part is adjacent to said first portion of said medium and said magnetic field has a second polarity relative to said magneto-optic medium substantially opposite to said first polarity, said means for reversing including means for generating an external magnetic field that is substantially parallel to said magneto-optic medium, wherein said reversal of said polarity is accomplished in less than a predetermined time interval.

2. An apparatus, as claimed in claim 1, wherein said means for reversing the polarity of the magnetic field comprises:
    at least two electromagnets positioned adjacent to said permanent magnet.

3. A magneto-optic data recording apparatus, comprising:
    a magneto-optic medium which can be magnetized by exposure to a magnetic field of a first magnitude when heated to a first temperature and which does not become magnetized upon exposure to a magnetic field of said first magnitude when the temperature of said medium is less than about said first temperature;
    light means for heating a first portion of said medium to at least said first temperature wherein portions of said medium adjacent to said first portion are at a temperature less than said first temperature;
    a permanent magnet having a first axis, a first part, a second part and a magnetic field with a magnitude at least equal to said first magnitude;
    means for positioning said permanent magnet wherein at least said first part is adjacent to said first portion of said medium and said magnetic field has a first polarity relative to said magneto-optic medium; and
    means for reversing the polarity of the magnetic field adjacent to said first portion by turning said permanent magnet about said first axis while avoiding contact of said permanent magnet with said magneto-optic medium to a position in which at least said second part is adjacent to said first portion of said medium and said magnetic field has a second polarity relative to said magneto optic medium substantially opposite to said first polarity, wherein said reversal of said polarity if accomplished in less than a predetermined time interval, and wherein said means for reversing polarity comprises:
        means for providing a first polarity signal related to the polarity of the magnetic field adjacent to said first portion;
        means for providing a second polarity signal related to a desired polarity of the magnetic field adjacent to said first portion;
        means for determining whether said magnetic field polarity substantially equals said desired polarity, using said first and second signals; and
        means for changing the polarity of the magnetic field adjacent said first portion when said magnetic field polarity is not substantially equal to said desired polarity.

4. An apparatus, as claimed in claim 3, wherein said means for providing a first polarity signal comprises:
    a first Hall sensor.

5. An apparatus as claimed in claim 3, wherein said means for providing a first polarity signal comprises:
    means for generating an analog first polarity signal; and
    means for converting said analog first polarity signal to a digital first polarity signal.

6. An apparatus, as claimed in claim 3, wherein said means for providing a second polarity signal comprises:
    means for providing a digital second polarity signal.

7. An apparatus, as claimed in claim 3, wherein said means for changing the polarity of the magnetic field adjacent to said first portion comprises:
    means for generating a change-polarity signal when said magnetic field polarity is not substantially equal to said desired polarity; and
    means for rotating said permanent magnet when said change-polarity signal is present.

8. An apparatus, as claimed in claim 7, wherein said means for generating a change-polarity signal comprises:
    an exclusive-or logic gate.

9. A magneto-optic data recording apparatus, comprising:
   a magneto-optic medium which can be magnetized by exposure to a magnetic field of a first magnitude when heated to a first temperature and which does not become magnetized upon exposure to a magnetic field of said first magnitude when the temperature of said medium is less than about said first temperature;
   light means for heating a first portion of said medium to at least said first temperature wherein portions of said medium adjacent to said first portion are at a temperature less than said first temperature;
   a permanent magnet having a first axis, a first part, a second part and a magnetic field with a magnitude at least equal to said first magnitude;
   means for positioning said permanent magnet wherein at least said first part is adjacent to said first portion of said medium and said magnetic field has a first polarity relative to said magneto-optic medium;
   means for reversing the polarity of the magnetic field adjacent to said first portion by turning said permanent magnet about said first axis while avoiding contact of said permanent magnet with said magneto-optic medium to a position in which at least said second part is adjacent to said first portion of said medium and said magnetic field has a second polarity relative to said magneto-optic medium substantially opposite to said first polarity, wherein said reversal of said polarity is accomplished in less than a predetermined time interval, wherein said means for reversing the polarity of the magnetic field comprises:
      at least two electromagnets positioned adjacent to said permanent magnet;
      means for applying a current to said electromagnets for a first period of time wherein said permanent magnet is rotationally accelerated;
      means for rotationally decelerating said permanent magnet for a second period of time; and
      means for substantially stopping rotation of said permanent magnet when said magnetic field polarity is substantially equal to said desired polarity.

10. An apparatus, as claimed in claim 9, wherein said means for substantially stopping the rotation of said permanent magnet comprises:
   a proportional-integral-differential amplifier.

11. An apparatus, as claimed in claim 2, wherein said means for reversing the polarity further comprises:
   a controller for activating said electromagnets during a first phase, deactivating said electromagnets during a second phase and activating said electromagnets during a third phase.

12. A magneto-optic data recording apparatus, comprising:
   a magneto-optic medium which can be magnetized by exposure to a magnetic field of a first magnitude when heated to a first temperature and which does not become magnetized upon exposure to a magnetic field of said first magnitude when the temperature of said medium is less than about said first temperature;
   light means for heating a first portion of said medium to at least said first temperature wherein portions of said medium adjacent to said first portion are at a temperature less than said first temperature;
   a permanent magnet having a first axis, a first part, a second part and a magnetic field with a magnitude at least equal to said first magnitude;
   means for positioning said permanent magnet wherein at least said first part is adjacent to said first portion of said medium and said magnetic field has a first polarity relative to said magneto-optic medium; and
   means for reversing the polarity of the magnetic field adjacent to said first portion by turning said permanent magnet about said first axis while avoiding contact of said permanent magnet with said magneto-optic medium to a position in which at least said second part is adjacent to said first portion of said medium and said magnetic field has a second polarity relative to said magneto-optic medium substantially opposite to said first polarity, wherein said reversal of said polarity is accomplished in less than a predetermined time interval, wherein said means for reversing the polarity of the magnetic field comprises;
      at least two electromagnets positioned adjacent to said permanent magnet; and
      a controller for activating said electromagnets during a first phase, deactivating said electromagnets during a second phase and activating said electromagnets during a third phase, wherein said first phase is about 11 milliseconds, said second phase is about 5 milliseconds, and said third phase is about 6 milliseconds.

13. An apparatus, as claimed in claim 1, wherein:
said first magnitude is at least about 400 gauss.

14. An apparatus, as claimed in claim 1, wherein:
said magneto-optic medium comprises a disk rotatable with a period of rotation; and
said predetermined time interval is less than about said period of rotation.

15. Apparatus, as claimed in claim 1, wherein
said medium comprises a material selected from the group consisting of gallium, terbium, iron, alloys thereof and compounds thereof.

16. Apparatus, as claimed in claim 1, wherein:
said permanent magnet comprises a neodymium-iron-boron alloy.

17. Apparatus, as claimed in claim 1, wherein:
said permanent magnet is in the form of a rectangular parallelepiped having edge dimensions of 52 millimeters, 4.5 millimeters, and 4.5 millimeters and wherein said permanent magnet is positioned such that when a face of said permanent magnet is parallel to said magneto-optic medium, the distance from said face to said magneto-optic medium is about 6.5 millimeters.

18. A method for providing a magneto-optical recording system comprising the steps of:
providing a magneto-optic recording medium having magnetic characteristics;
providing a permanent magnet of a suitable size and mass density and having a second magnetic field, said size and said second magnetic field depending upon said magnetic characteristics of said magneto-optic recording medium;
providing an actuating device for generating a third magnetic field oriented substantially parallel to said magneto-optic recording medium;
positioning said permanent magnet at a location relative to said magneto-optic recording medium while avoiding contact between said permanent magnet and said magneto-optic recording medium; and moving said permanent magnet using said third magnetic field of said actuating device, said step of moving being used to change said polarity of said second magnetic field adjacent to said magneto-optic recording medium.

19. A method, as claimed in claim 18, wherein said step of providing a permanent magnet comprises:

providing said permanent magnet in the form of a rectangular parallelepiped having edge dimensions of 52 millimeters, 4.5 millimeters, and 4.5 millimeters and wherein said permanent magnet is positioned such that when the first face of said permanent magnet is parallel to said disk, the distance from said face to said disk is about 6 millimeters.

20. A method for recording and erasing a bit of information on a magnetizable medium comprising the steps of:

providing a recording medium comprising material which can be magnetized by exposure to a magnetic field of a defined magnitude when heated to a defined temperature;

heating a portion of said recording medium to at least said defined temperature using light means;

positioning a permanent magnet adjacent to said heated portion of said recording medium to record a bit of information, said permanent magnet providing a first magnetic field having a first magnetic polarity relative to said recording medium and a magnitude at least equal to said defined magnitude adjacent to said disk; and reversing the polarity of said first magnetic field relative to said recording medium to erase said bit of information using a second magnetic field oriented substantially parallel to said recording medium to move said permanent magnet.

21. The method of claim 20 wherein:

said step of providing a recording medium comprises rotatably mounting a disk wherein said disk is rotated with a period of rotation; and said step of reversing polarity comprises rotating said permanent magnet by about 180° in a time period less than said period of rotation of said disk.

22. A magneto-optic data recording apparatus, comprising:

a magneto-optic recording medium which can be magnetized by exposure to a magnetic field having a defined magnitude when heated to a defined temperature and which does not become magnetized upon exposure to a magnetic field having said defined magnitude when the temperature of said magneto-optic recording medium is less than about said defined temperature;

means for heating a first portion of said magneto-optic recording medium to at least said first temperature, wherein portions of said magneto-optic recording medium adjacent to said first portion are at a temperature less than said defined temperature;

a permanent magnet having a first magnetic field with a first magnitude at least equal to said defined magnitude;

means for positioning said permanent magnet adjacent to said first portion of said magneto-optic recording medium; and means for moving said permanent magnet from a first position where said first magnetic field has a first polarity relative to said magneto-optic recording medium to a second position where said first magnetic field has a second polarity relative to said magneto-optic recording medium substantially opposite to said first polarity, wherein said means for moving includes means for generating a second magnetic field oriented substantially parallel to said magneto-optic reocrding medium.

23. A magneto-optic data recording apparatus, as claimed in claim 22, wherein:

said means for moving includes a proportional-integral-derivative controller.

24. A magneto-optic data recording apparatus, comprising:

a magneto-optic recording medium which can be magnetized by exposure to a magnetic field having a defined magnitude when heated to a defined temperature and which does not become magnetized upon exposure to a magnetic field having said defined magnitude when the temperature of said magneto-optic recording medium is less than about said defined temperature;

means for heating a first portion of said magneto-optic recording medium to at least said first temperature, wherein portions of said magneto-optic reocrding medium adjacent to said first portion are at a temperature less than said defined temperature;

a permanent magnet having a first magnetic field with a first magnitude at least equal to said defined magnitude;

means for positioning said permanent magnet adjacent to said first portion of said magneto-optic recording medium; and means for moving said permanent magnet from a first position where said first magnetic field has a first polarity relative to said magneto-optic recording medium to a second position where said first magnetic field has a second polarity relative to said magneto-optic recording medium substantially opposite to said first polarity, wherein said means for moving includes means for controlling the rate at which said permanent magnet moves from said first position to said second position and wherein said means for moving includes means for generating a second magnetic field oriented substantially parallel to said magneto-optic recording medium.

25. A magneto-optic data recording apparatus, as claimed in claim 24, wherein:

said means for controlling the rate at which said permanent magnet is moved from said first position to said second position includes a proportional-integral-derivative controller.

* * * * *